US010088010B2

(12) United States Patent
Ueki

(10) Patent No.: US 10,088,010 B2
(45) Date of Patent: Oct. 2, 2018

(54) VIBRATION ISOLATION DEVICE

(71) Applicant: BRIDGESTONE CORPORATION, Tokyo (JP)

(72) Inventor: Akira Ueki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 5 days.

(21) Appl. No.: 15/302,694

(22) PCT Filed: Mar. 11, 2015

(86) PCT No.: PCT/JP2015/057150
§ 371 (c)(1),
(2) Date: Oct. 7, 2016

(87) PCT Pub. No.: WO2015/163027
PCT Pub. Date: Oct. 29, 2015

(65) Prior Publication Data
US 2017/0023091 A1    Jan. 26, 2017

(30) Foreign Application Priority Data

Apr. 24, 2014   (JP) ................................. 2014-090686

(51) Int. Cl.
    *F16F 13/10*        (2006.01)
    *B60K 5/12*         (2006.01)

(52) U.S. Cl.
CPC .......... *F16F 13/107* (2013.01); *B60K 5/1208* (2013.01); *F16F 13/10* (2013.01); *F16F 13/105* (2013.01)

(58) Field of Classification Search
CPC ......... F16F 13/107; F16F 13/10; F16F 13/105
(Continued)

(56) References Cited

U.S. PATENT DOCUMENTS

| 4,483,521 A | * | 11/1984 | Kakimoto | ............. F16F 13/107 267/140.13 |
| 4,681,306 A | * | 7/1987 | Hofmann | ............. F16F 13/262 188/139 |

(Continued)

FOREIGN PATENT DOCUMENTS

| EP | 2 221 503 A1 | 8/2010 |
| JP | 58-018143 U | 2/1983 |

(Continued)

OTHER PUBLICATIONS

Communication dated May 3, 2017, from the European Patent Office in counterpart European application No. 15782452.5.
(Continued)

*Primary Examiner* — Thomas W Irvin
(74) *Attorney, Agent, or Firm* — Sughrue Mion, PLLC

(57) ABSTRACT

A vibration isolation device (10) of the present invention includes a tubular first attachment member (11) coupled to one of a vibration generating part and a vibration receiving part, and a second attachment member (12) coupled to the other thereof, an elastic body (13) which couples both the attachment members together, and a partition member (16) which partitions a liquid chamber within the first attachment member (11) having a liquid (L) enclosed therein into a first liquid chamber (14) and a second liquid chamber (15), in which at least one of the first liquid chamber (14) and the second liquid chamber (15) has the elastic body (13) as a portion of a wall surface thereof, the partition member (16) includes an intermediate chamber (43) which is disposed inside the partition member (16), a first communication passage (42*a*) which communicates with the intermediate chamber (43) and the first liquid chamber (14), and a second communication passage (42*b*) which communicates with the intermediate chamber (43) and the second liquid chamber (15), and a barrier rigid body (33) which faces at least one (Continued)

of the first communication passage (42*a*) and the second communication passage (42*b*) is disposed inside the intermediate chamber (43).

19 Claims, 14 Drawing Sheets

(58) Field of Classification Search
USPC .................................... 267/140.11, 140.13
See application file for complete search history.

(56) References Cited

U.S. PATENT DOCUMENTS

| | | | | | |
|---|---|---|---|---|---|
| 4,697,793 | A | * | 10/1987 | Reuter | F16F 13/105 |
| | | | | | 267/140.13 |
| 4,739,962 | A | * | 4/1988 | Morita | F16F 9/34 |
| | | | | | 267/140.13 |
| 4,795,140 | A | * | 1/1989 | Orikawa | F16F 13/24 |
| | | | | | 267/140.13 |
| 4,896,867 | A | * | 1/1990 | Schyboll | F16F 13/107 |
| | | | | | 138/30 |
| 4,903,951 | A | * | 2/1990 | Miyamoto | F16F 13/103 |
| | | | | | 267/140.13 |
| 5,112,032 | A | * | 5/1992 | Klein | F16F 13/105 |
| | | | | | 180/312 |
| 5,876,022 | A | * | 3/1999 | Simuttis | F16F 13/106 |
| | | | | | 248/562 |
| 5,895,032 | A | * | 4/1999 | Simuttis | F16F 13/108 |
| | | | | | 267/140.12 |
| 9,772,003 | B2 | * | 9/2017 | Ueki | F16F 13/107 |
| 2004/0089989 | A1 | | 5/2004 | Tewani et al. | |
| 2010/0213650 | A1 | | 8/2010 | Katayama et al. | |
| 2011/0001281 | A1 | | 1/2011 | Kanaya et al. | |
| 2014/0175719 | A1 | | 6/2014 | Kanaya | |
| 2014/0232049 | A1 | | 8/2014 | Kanaya | |
| 2016/0102728 | A1 | * | 4/2016 | Ueki | F16F 13/107 |
| | | | | | 267/140.13 |
| 2016/0160956 | A1 | * | 6/2016 | Ueki | F16F 13/107 |
| | | | | | 267/140.13 |
| 2016/0245364 | A1 | * | 8/2016 | Ueki | F16F 13/107 |
| 2016/0281814 | A1 | * | 9/2016 | Ueki | F16F 13/107 |
| 2016/0298716 | A1 | * | 10/2016 | Ueki | F16F 13/107 |
| 2017/0016508 | A1 | * | 1/2017 | Ueki | F16F 13/10 |
| 2017/0023089 | A1 | * | 1/2017 | Ueki | F16F 13/105 |
| 2017/0023090 | A1 | * | 1/2017 | Ueki | F16F 13/10 |
| 2017/0030428 | A1 | * | 2/2017 | Ueki | B60K 5/1208 |
| 2017/0045108 | A1 | * | 2/2017 | Ueki | F16F 13/10 |

FOREIGN PATENT DOCUMENTS

| | | |
|---|---|---|
| JP | 61-156749 U | 9/1986 |
| JP | 61-156750 U | 9/1986 |
| JP | 2007-120598 A | 5/2007 |
| JP | 2009-150451 A | 7/2009 |
| JP | 2010025149 A | 2/2010 |
| JP | 2010-203547 A | 9/2010 |
| JP | 2012-026510 A | 2/2012 |
| JP | 2013-210093 A | 10/2013 |
| WO | 2013114476 A1 | 8/2013 |

OTHER PUBLICATIONS

Communication dated Dec. 11, 2017 from the State Intellectual Property Office of the P.R.C. in counterpart Application No. 201580020563.X.

* cited by examiner

VIBRATION ISOLATION DEVICE

CROSS REFERENCE TO RELATED APPLICATIONS

This application is a National Stage of International Application No. PCT/JP2015/057150 filed Mar. 11, 2015, claiming priority based on Japanese Patent Application No. 2014-090686 filed Apr. 24, 2014, the contents of all of which are incorporated herein by reference in their entirety.

TECHNICAL FIELD

The present invention relates to a vibration isolation device which is applied to automobiles, industrial machines, or the like, for example, and absorbs and dampens the vibrations of vibration generating parts such as engines.

BACKGROUND ART

For example, as this type of vibration isolation device, a configuration described in the following Patent Document 1 is known. This vibration isolation device includes a tubular first attachment member which is coupled to one of a vibration generating part and a vibration receiving part, a second attachment member which is coupled to the other thereof, an elastic body which couples both the attachment members together, and a partition member which partitions a liquid chamber within the first attachment member having a liquid enclosed therein into a first liquid chamber and a second liquid chamber. This vibration isolation device further includes a first limit passage and a second limit passage which allows both the liquid chambers to communicate with each other, a cylinder chamber which is provided between both the liquid chambers, and a plunger member disposed so as to be movable between an open position and a closed position within the cylinder chamber.

For example, vibrations of a plurality of kinds having frequencies different from each other, such as idle vibrations and shake vibrations, are input to this vibration isolation device. Thus, in this vibration isolation device, the respective resonant frequencies of the first limit passage and the second limit passage are set (tuned) to the respective frequencies of the different kinds of vibration. As the plunger member moves between the open position and the closed position according to the frequencies of input vibrations, a limit passage through which a liquid flows is switched between the first limit passage and the second limit passage.

CITATION LIST

Patent Document

[Patent Document 1] Japanese Unexamined Patent Application, First Publication No. 2007-120598

SUMMARY OF INVENTION

Technical Problem

However, in the vibration isolation device of the related art, there is room for improvement in simplification of structure and facilitation of manufacture.

In addition, for example, in the vibration isolation device of the related art, when unintended vibrations, such as fine vibrations having higher frequencies and extremely smaller amplitudes than the resonant frequency of a limit passage determined depending on the passage length, the cross-sectional area, or the like of the limit passage, are input, a dynamic spring constant may increase due to clogging of the limit passage, which may influence the product characteristics of the vibration isolation device, such as the driving comfort of automobiles.

The present invention is made in consideration of the above-described circumstances, and an object thereof is to provide a vibration isolation device in which simplification of structure and facilitation of manufacture can be improved while product characteristics can be secured.

Solution to Problem

In order to solve the above-described problems, the present invention suggests the following means.

According to an aspect of the present invention, there is provided a vibration isolation device, including: a tubular first attachment member coupled to one of a vibration generating part and a vibration receiving part, and a second attachment member coupled to the other thereof; an elastic body which couples both the attachment members together; and a partition member which partitions a liquid chamber within the first attachment member having a liquid enclosed therein into a first liquid chamber and a second liquid chamber, in which at least one of the first liquid chamber and the second liquid chamber has the elastic body as a portion of a wall surface thereof, the partition member includes an intermediate chamber which is disposed inside the partition member, a first communication passage which communicates with the intermediate chamber and the first liquid chamber, and a second communication passage which communicates with the intermediate chamber and the second liquid chamber, and a barrier rigid body which faces at least one of the first communication passage and the second communication passage is disposed inside the intermediate chamber.

In this invention, when vibrations are input and a liquid flows through the first communication passage, the intermediate chamber, and the second communication passage between the first liquid chamber and the second liquid chamber, the liquid collides with the barrier rigid body. In this case, if a flow speed of the liquid is high, the pressure loss of the liquid increases and vibrations are absorbed and dampened due to energy loss generated by collision between the liquid and the barrier rigid body, or the like. Meanwhile, if the flow speed of the liquid is low, the pressure loss of the liquid due to the above-described collision is suppressed, the liquid smoothly flows into the first communication passage, the intermediate chamber, and the second communication passage, and an increase in a dynamic spring constant is suppressed.

According to this vibration isolation device, the pressure loss of the liquid increases according to the flow speed of the liquid which flows into the first communication passage, the intermediate chamber, and the second communication passage, and thus, it is possible to absorb and dampen vibrations. Therefore, for example, when normal vibrations such as idle vibrations or shake vibrations are input, it is possible to absorb and dampen the vibrations regardless of frequencies of the vibrations. Accordingly, occurrence of noise is prevented while vibrations of a plurality of kinds having frequencies different from each other are absorbed and dampened, and thus, it is possible to improve simplification of structure and facilitation of manufacture.

In addition, in a state where a flow speed is low and the pressure loss of the liquid is suppressed, the liquid smoothly flows into the first communication passage, the intermediate chamber, and the second communication passage, and an increase in the dynamic spring constant is suppressed. Accordingly, for example, when unintended vibrations such as fine vibrations having higher frequencies and extremely smaller amplitudes than normal vibrations are input, that is, when the flow speed of the liquid is lower than the flow speed when normal vibrations are input, it is possible to suppress an increase in the dynamic spring constant. As a result, it is possible to easily secure the product characteristics of the vibration isolation device.

The first communication passage and the second communication passage may face each other in a state where the intermediate chamber is interposed therebetween, and the barrier rigid body may be interposed between the first communication passage and the second communication passage inside the intermediate chamber.

In this case, since the barrier rigid body is interposed between the first communication passage and the second communication passage inside the intermediate chamber, a liquid which flows into the intermediate chamber from any of the first liquid chamber and the second liquid chamber can reliably collide with the barrier rigid body. Accordingly, it is possible to effectively absorb and dampen vibrations.

The partition member may include a limit passage which is provided independently from the intermediate chamber, the first communication passage, and the second communication passage, and communicates with the first liquid chamber and the second liquid chamber.

In this case, if the flow speed of the liquid which flows through the first communication passage, the intermediate chamber, and the second communication passage increases when vibrations are input and the pressure loss of the liquid increases, a flow resistance of the liquid which flows through the first communication passage, the intermediate chamber, and the second communication passage increases. As a result, the liquid positively flows through the limit passage between the first liquid chamber and the second liquid chamber. In this case, since resonance is generated in the limit passage, the input vibrations are further absorbed and dampened.

In this way, for example, when normal vibrations are input, it is possible to absorb and dampen vibrations by not only the pressure loss of the liquid but also the resonance in the limit passage. Accordingly, it is possible to effectively absorb and dampen the vibrations.

Advantageous Effects of Invention

According to the present invention, it is possible to improve simplification of structure and facilitation of manufacture while securing product characteristics.

DESCRIPTION OF EMBODIMENTS

First Embodiment

Hereinafter, a first embodiment of a vibration isolation device according to the present invention will be described with reference to FIGS. 1 to 3.

Figure 1:
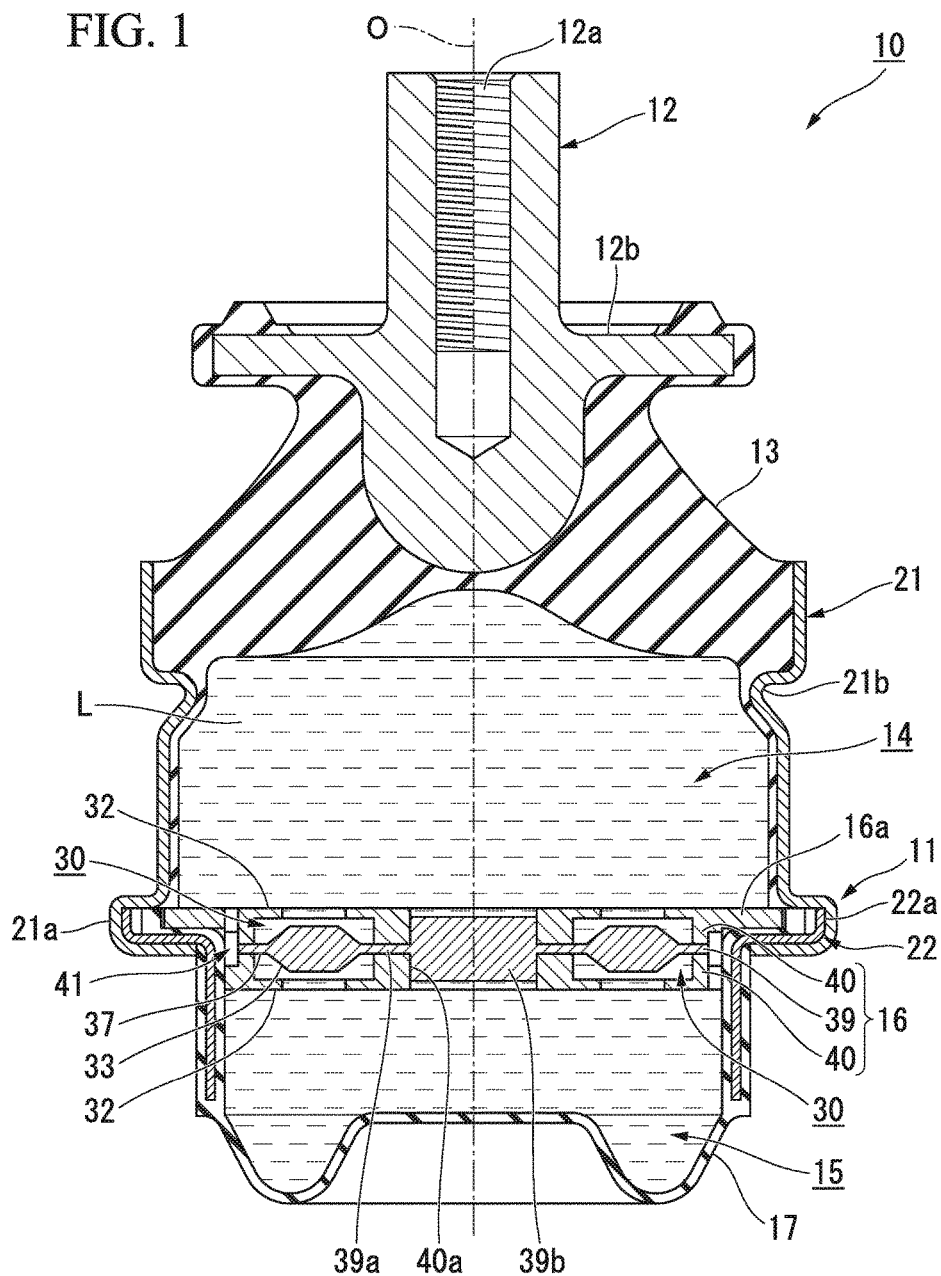
FIG. 1 is a longitudinal sectional view of a vibration isolation device according to a first embodiment of the present invention.

As shown in FIG. 1, a vibration isolation device 10 includes a tubular first attachment member 11 which is coupled to any one of a vibration generating part and a vibration receiving part, a second attachment member 12 which is coupled to the other thereof, an elastic body 13 which couples both the attachment members 11 and 12 together, and a partition member 16 which partitions a liquid chamber within the first attachment member 11 having a liquid L enclosed therein into a main liquid chamber (first liquid chamber) 14 which has the elastic body 13 as a portion of a wall surface thereof, and an auxiliary liquid chamber (second liquid chamber) 15.

In the shown example, the second attachment member 12 is formed in a columnar shape, the elastic body 13 is formed in a tubular shape, and the first attachment member 11, the second attachment member 12, and the elastic body 13 are disposed coaxially with a common axis. Hereinafter, this common axis is referred to as an axis (an axis of the first attachment member and an axis of the partition member) O, a main liquid chamber 14 side along a direction (a flow passage axis direction of a communication part and an axial direction of the partition member) of the axis O is referred to as first side, the auxiliary liquid chamber 15 side along the direction of the axis O is referred to as the second side, a direction orthogonal to the axis O is referred to as a radial direction (a radial direction of the first attachment member and a radial direction of the partition member), and a direction around the axis O is referred to as a circumferential direction (a circumferential direction of the first attachment member and a circumferential direction of the partition member).

In addition, for example, in a case where the vibration isolation device 10 is mounted on an automobile, the second attachment member 12 is coupled to the engine serving as the vibration generating part. Meanwhile, the first attachment member 11 is coupled to a vehicle body serving as the vibration receiving part via a bracket (not shown), and prevents vibrations of the engine from being transmitted to the vehicle body. For example, the vibration isolation device 10 is a liquid-enclosed type, in which the liquid L such as ethylene glycol, water, or silicone oil is enclosed in a liquid chamber of the first attachment member 11.

The first attachment member 11 includes a first side outer tube body 21 located on first side in the direction of the axis O, and a second side outer tube body 22 located on the second side in the direction of the axis O.

The elastic body 13 is coupled to a first side end of the first side outer tube body 21 in a liquid-tight state. A first side opening of the first side outer tube body 21 is closed by the elastic body 13. The second side end 21a of the first side outer tube body 21 is formed with a larger diameter than those of the other portions. The inside of the first side outer tube body 21 serves as the main liquid chamber 14. When vibrations are input, the elastic body 13 is deformed, the internal volume of the main liquid chamber 14 varies, and thus, the liquid pressure of the main liquid chamber 14 fluctuates.

In addition, an annular groove 21b which continuously extends over the entire circumference of the first side outer tube body 21 is formed in the portion of the first side outer tube body 21 which is connected to a portion, to which the elastic body 13 is coupled, from the second side.

A diaphragm 17 is coupled to the second side end of the second side outer tube body 22 in a liquid-tight state, and the second side opening of the second side outer tube body 22 is closed by the diaphragm 17. A first side end 22a of the other-side outer tube body 22 is formed with a larger diameter than those of the other portions and is fitted into the second side end 21a of the first side outer tube body 21. In addition, the partition member 16 is fitted into the second side outer tube body 22, and the portion inside the second side outer tube body 22 positioned between the partition member 16 and the diaphragm 17 serves as the auxiliary liquid chamber 15. The auxiliary liquid chamber 15 has the diaphragm 17 as a portion of a wall surface thereof and is expanded and contracted when the diaphragm 17 is deformed. In addition, the second side outer tube body 22 is covered over substantially the entire region with a rubber membrane formed integrally with the diaphragm 17.

A female thread part 12a is formed coaxially with the axis O on first side end surface of the second attachment member 12. The second attachment member 12 protrudes from the first attachment member 11 to the first side. A flange part 12b which protrudes toward a radial outer side and continuously extends over the entire circumference is formed in the second attachment member 12. The flange part 12b is separated from first side end edge of the first attachment member 11 to the first side.

For example, the elastic body 13 is formed of a rubber material or the like capable of being elastically deformed, and is formed in a tubular shape that has a gradually enlarged diameter from the first side toward the second side. First side end of the elastic body 13 is coupled to the second attachment member 12, and the second side end thereof is coupled to the first attachment member 11.

In addition, the inner peripheral surface of the first side outer tube body 21 of the first attachment member 11 is covered over substantially the entire region with the rubber membrane formed integrally with the elastic body 13.

The partition member 16 is formed in a disk shape which is disposed coaxially with the axis O, and is fitted into the first attachment member 11. A flange part 16a which protrudes toward the radial outer side is provided on the partition member 16. The flange part 16a is provided on the first side end of the partition member 16. The flange part 16a is disposed inside the first side end 22a of the second side outer tube body 22.

Communication parts 30 which communicate with the main liquid chamber 14 and the auxiliary liquid chamber 15 are provided on the partition member 16.

A plurality of communication parts 30 are provided on the partition member 16 in the circumferential direction, and penetrate the partition member 16 in the direction of the axis O. The plurality of communication parts 30 are intermittently disposed on the partition member 16 over the entire circumference in the circumferential direction, and the plurality of communication parts 30 are disposed on the same circumference having the axis O as a center and form annular passage rows 31.

Figure 3:
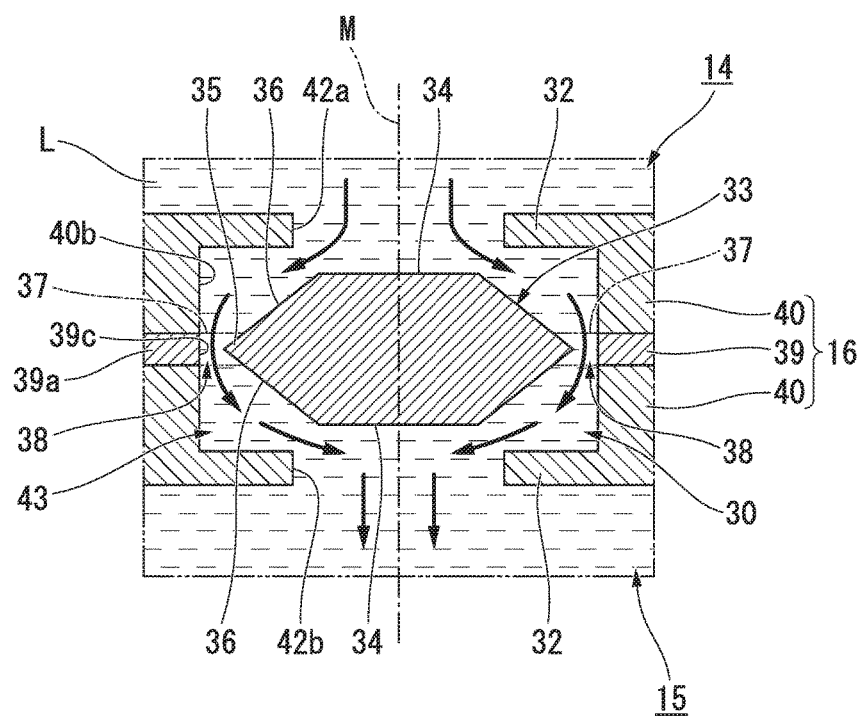
FIG. 3 is a longitudinal sectional view showing a main portion of the partition member shown in FIG. 2.

As shown in FIG. 3, each of the communication parts 30 extends in the direction of the axis O, and is opened to each of both end surfaces of the partition member 16 in the direction of the axis O. The communication part 30 linearly extends in the direction of the axis O when the partition member 16 is viewed from a longitudinal cross-section in the direction of the axis O, and the communication part 30 is circularly formed in a plan view when the partition member 16 is viewed in the direction of the axis O. The communication part 30 is formed in a columnar shape which extends in the direction of the axis O.

An annular throttle part (first confluent part) 32, which protrudes toward the inner side in a flow passage radial direction (insertion direction) which is a radial direction of the communication part 30, is provided on each of both ends of the communication part 30 in the direction of the axis O. The throttle part 32 is disposed coaxially with a flow passage axis M of the communication part 30, and the inner side of the throttle part 32 configures the end of the communication part 30 in the direction of the axis O. In the communication part 30, the diameter of each of both ends in the direction of the axis O is smaller than that of an intermediate part positioned between both ends.

That is, the communication part 30 includes an intermediate chamber 43 which is disposed in the partition member 16, a first communication passage 42a which communicates with the intermediate chamber 43 and the main liquid chamber 14, and a second communication passage 42b which communicates with the intermediate chamber 43 and the auxiliary liquid chamber 15. The intermediate chamber 43 is defined between two throttle parts 32. The first communication passage 42a is configured of the inside of the throttle part 32 which is positioned on first side of two throttle parts 32. The second communication passage 42b is configured of the inside of the throttle part 32 which is positioned on the second side of two throttle parts 32.

The first communication passage 42a and the second communication passage 42b face each other in a state where the intermediate chamber 43 is interposed therebetween. In the present embodiment, the intermediate chamber 43, the first communication passage 42a, and the second communication passage 42b are disposed on an axis common to each other. Hereinafter, this common axis is referred to as the flow passage axis M.

The first communication passage 42a and the second communication passage 42b configures ends of the communication part 30 in the direction of the flow passage axis M, and the intermediate chamber 43 configures the center part of the communication part 30 in the direction of the flow passage axis M.

In addition, in the communication part 30, for example, D1/D0 which is a ratio of a diameter D1 of the first communication passage 42a with respect to a diameter D0 of the intermediate chamber 43, and D2/D0 which is a ratio of a diameter D2 of the second communication passage 42b with respect to the diameter D0 of the intermediate chamber 43 are 1/10 or more to 1/2 or less.

Here, a barrier rigid body 33 is provided inside the communication part 30. The barrier rigid body 33 is provided inside each of the plurality of communication parts 30. For example, the barrier rigid body 33 is formed of a resin material or the like, is a rigid body which has rigidity at which the barrier rigid body 33 is not deformed when being subjected to the flow of the liquid L, and is formed integrally with the partition member 16.

The barrier rigid body 33 is disposed inside the intermediate chamber 43. The barrier rigid body 33 faces at least one of the first communication passage 42a and the second communication passage 42b. In the present embodiment, the barrier rigid body 33 is interposed between the first communication passage 42a and the second communication passage 42b inside the intermediate chamber 43, and faces both of the first communication passage 42a and the second communication passage 42b. The barrier rigid body 33 is disposed on the flow passage axis M, and in the shown example, is disposed coaxially with the flow passage axis M.

In addition, in the present embodiment, the barrier rigid body 33 branches the flow of the liquid L which flows through the communication part 30 between the main liquid chamber 14 and the auxiliary liquid chamber 15, causes the branched liquid L to flow along the surface of the barrier rigid body 33, and thus, bends the flow of the liquid L.

The barrier rigid body 33 is accommodated in the intermediate chamber 43 of the communication part 30, and is deviated in the direction of the axis O with respect to the throttle parts 32. The barrier rigid body 33 is disposed on the flow passage axis M in a state of being separated from the inner peripheral surface of the communication part 30. The barrier rigid body 33 is formed in a columnar shape which is disposed coaxially with the flow passage axis M. The barrier rigid body 33 is symmetrically formed in the direction of the axis O and is formed in a shape in which bottom surfaces of a pair of truncated cones are butted each other.

In the barrier rigid body 33, the diameter thereof gradually decreases from the center in the direction of the axis O toward both outer sides. End surfaces 34 of the barrier rigid body 33 in the direction of the axis O are flat surfaces which extend to be orthogonal to the flow passage axis M. Acute-angle parts 35 which protrude toward the outer side in the flow passage radial direction are provided on the outer peripheral surface of the barrier rigid body 33 on the center parts in the direction of the axis O. Each of the acute-angle parts 35 divides the outer peripheral surface of the barrier rigid body 33 into a pair of tapered surfaces 36 in the direction of the axis O. Each tapered surface 36 couples the acute-angle part 35 and the end surface 34 of the barrier rigid body 33 over the entire circumference around the flow passage axis M, and the diameter of the tapered surface 36 gradually decreases from the acute-angle part 35 toward the end surface 34. In addition, the outer diameter of the acute-angle part 35 is larger than the outer diameter of the first communication passage 42a or the outer diameter of the second communication passage 42b, and the outer diameter of the end surface 34 of the barrier rigid body 33 is smaller than the outer diameter of the first communication passage 42a or the outer diameter of the second communication passage 42b.

Figure 2:
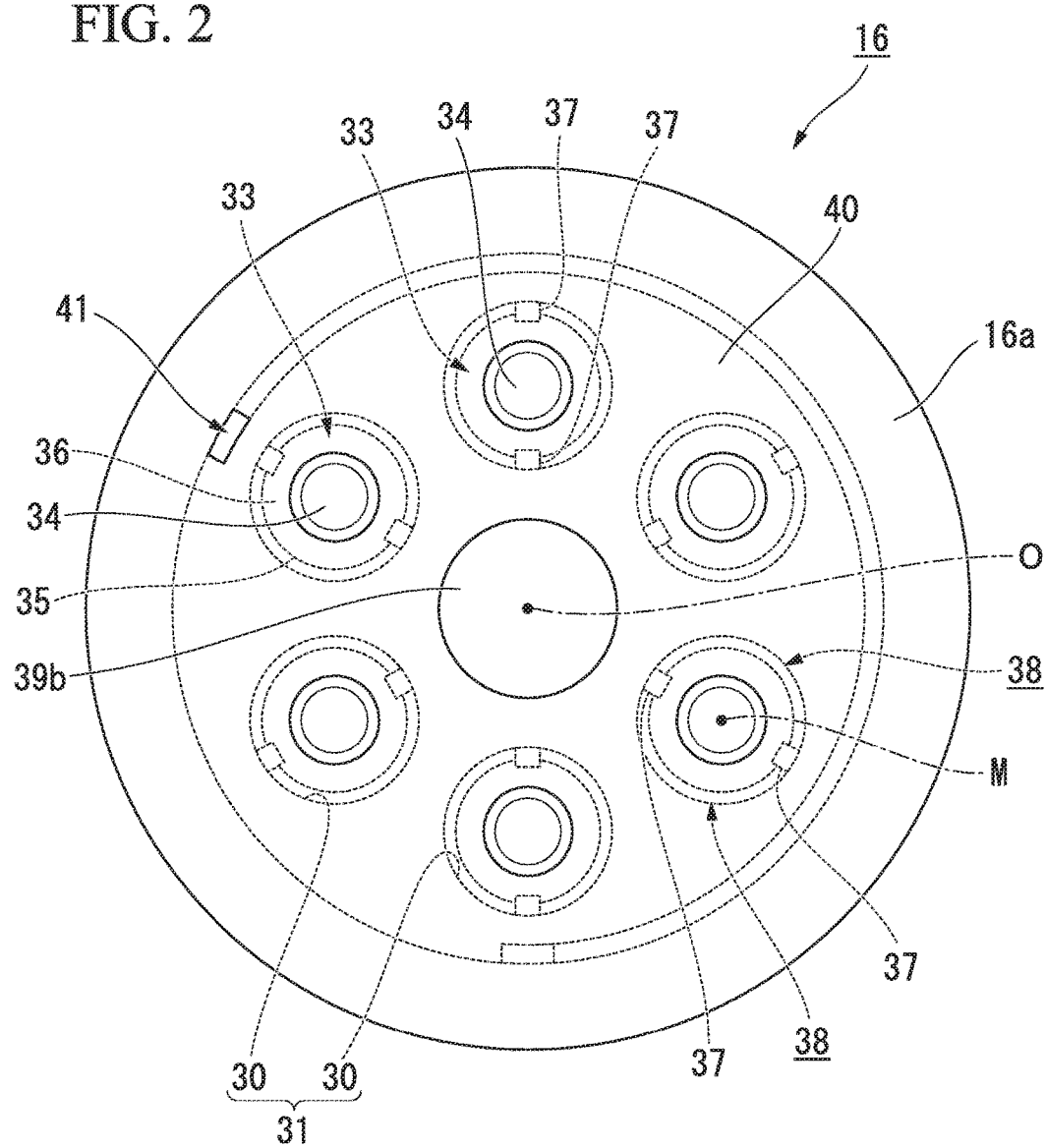
FIG. 2 is a plan view showing a partition member which configures the vibration isolation device shown in FIG. 1.

As shown in FIGS. 2 and 3, the barrier rigid body 33 is coupled to the partition member 16 via bridge parts 37. The bridge parts 37 couple the acute-angle parts 35 which are the center parts on the outer peripheral surface of the barrier rigid body 33 in the direction of the axis O to the center parts on the inner peripheral surface of the intermediate chamber 43 in the direction of the axis O. Each of the bridge parts 37 is formed in a rod shape which extends in the flow passage radial direction, and the pair of bridge parts 37 is disposed such that the flow passage axis M is interposed therebetween in the flow passage radial direction. Portions of the intermediate chamber 43 interposed between the pair of bridge parts 37 around the flow passage axis M are open toward both sides in the direction of the axis O, and thus, passing gaps 38 through which the liquid L passes in the direction of the axis O are provided. A pair of passing gaps 38 is provided between the outer peripheral surface of the barrier rigid body 33 and the inner peripheral surface of the intermediate chamber 43 such that the barrier rigid body 33 is interposed between the pair of passing gaps 38. The barrier rigid body 33 is interposed between the passing gaps 38 in the flow passage radial direction in a plan view.

As shown in FIGS. 1 and 3, three divided bodies 39 and 40 are combined to each other so as to configure the partition member 16. The three divided bodies 39 and 40 include a center divided body 39 and a pair of outer divided bodies 40. In the partition member 16, the center divided body 39 is interposed between the pair of outer divided bodies 40 from the outer side in the direction of the axis O, and for example, the three divided bodies 39 and 40 are fixed to each other in the direction of the axis O by fixing means (not shown) such as bolts.

The center divided body 39 includes a plate-shaped main body part 39a which faces the direction of the axis O. The main body part 39a is disposed coaxially with the axis O, and a shaft part 39b which extends in the direction of the axis O is provided to penetrate the center part of the main body part 39a in the radial direction. The shaft part 39b is disposed coaxially with the axis O, and protrudes from the main body part 39a toward both sides which are the first side and the second side. A plurality of through holes 39c which configure the communication part 30 are formed in the center divided body 39. The barrier rigid body 33 is disposed inside each of the through holes 39c, and the barrier rigid body 33 is integrally coupled to the inner peripheral surface of the through hole 39c via the bridge parts 37.

The pair of outer divided bodies 40 is formed so as to have the same shape and the same size as each other. Each of the outer divided bodies 40 is formed in a plate shape facing the direction of the axis O and is disposed coaxially with the axis O. A mounting hole 40a which penetrate the outer divided body 40 in the direction of the axis O and a plurality of flow passage formation holes 40b are formed on the outer divided body 40. The mounting hole 40a is disposed coaxially with the axis O, and the shaft part 39b is fitted into the mounting hole 40a. Each of the flow passage formation holes 40b configures the communication part 30.

Here, in the present embodiment, a limit passage 41 is further provided in the partition member 16. The limit passage 41 is provided independently from the communication part 30 in the partition member 16. The limit passage 41 has the same flow passage cross-sectional area over the entire length of the limit passage 41 in the flow passage axis direction. The resonant frequency of the limit passage 41 is the same as the frequency of the vibration which is normally input to the vibration isolation device 10, and the limit passage 41 generates resonance (liquid column resonance) with respect to the input of the normal vibration (first vibration). For example, as the normal vibration, there is a shake vibration (for example, frequency is 14 Hz or less and amplitude is more than 0.5 mm), an idle vibration (for example, frequency is 18 Hz to 30 Hz and amplitude is ±0.5 mm or less) which has higher frequency and smaller amplitude than those of the shake vibration, or the like.

The resonant frequency of the limit passage 41 is lower than the resonant frequency of the first communication passage 42a and the resonant frequency of the second communication passage 42b. The resonant frequencies of the communication passages 42a and 42b are the same as each other. For example, each of the resonant frequencies of the communication passages 42a and 42b is the same as the frequency of an unintended vibration (second vibration) such as a fine vibration which has a higher frequency and extremely smaller amplitude than those of the above-described normal vibration. For example, the resonant frequency of each of the first communication passage 42a, the second communication passage 42b, and the limit passages 41 is determined based on each of a flow passage length, a flow passage cross-sectional area, or the like of the first communication passage 42a, the second communication passage 42b, and limiting passages 41.

In addition, the liquid L easily and preferentially flows through the communication part 30 to the limit passage 41 immediately after the normal vibrations are input to the vibration isolation device 10. For example, this configuration can be realized by adjusting each of the flow passage length, the flow passage cross-sectional area, or the like of the limit passages 41 and the communication parts 30.

Next, an operation of the vibration isolation device 10 will be described.

If a vibration is input from the vibration generating part to the vibration isolation device 10 shown in FIG. 1 in the direction of the axis O, both the attachment members 11 and 12 are displaced relative to each other while elastically deforming the elastic body 13, and thus, the liquid pressure in the main liquid chamber 14 fluctuates. Accordingly, the liquid L comes and goes between the main liquid chamber 14 and the auxiliary liquid chamber 15 through the communication parts 30. In this case, in the present embodiment, the liquid L preferentially comes and goes through the communication parts 30 to the limit passage 41. If the liquid L inside the main liquid chamber 14 flows toward the auxiliary liquid chamber 15 side through the communication part 30, as shown in FIG. 3, first, the liquid L flows from the first communication passage 42a into the communication part 30 to reach the intermediate chamber 43, and the liquid L collides with the barrier rigid body 33.

Here, for example, normally, vibrations such as idle vibrations or shake vibrations are input to the vibration isolation device 10. Among the vibrations, in the idle vibrations, the frequencies are high while the amplitudes are relatively small, and in the shake vibrations, the amplitudes are great while the frequencies are low. Accordingly, when the normal vibrations are input, the flow speed of the liquid L which flows into the communication part 30 increases so as to be a predetermined value or more.

In this way, if the flow speed of the liquid L increases, pressure loss of the liquid L increases due to energy loss generated by collision between the liquid L and the barrier rigid body 33 or the like, and the vibrations are absorbed and dampened. In addition, in the present embodiment, since the flow passage cross-sectional area of the first communication passage 42a is smaller than the flow passage cross-sectional area of the intermediate chamber 43, it is possible to effectively increase the flow speed of the liquid L.

In addition, after the liquid L collides with the barrier rigid body 33, the barrier rigid body 33 branches the flow of the liquid L flowing into the communication part 30 toward the outer side in the flow passage radial direction. In this case, liquid L flows along the tapered surfaces 36 of the surfaces of the barrier rigid body 33, and thus, the flow of the liquid L is branched toward the outer side in the flow passage radial direction while being directed to the second side. Moreover, the liquid L passes through the passing gaps 38 inside the communication part 30 in the direction of the axis O.

Thereafter, the second side throttle part 32, which is disposed to be deviated in the direction of the axis O with respect to the barrier rigid body 33, directs the flow of the liquid L passing through the passing gaps 38 toward the inner side in the flow passage radial direction. Accordingly, the flows of the liquid L branched by the barrier rigid body 33 are combined such that the directions of the flows face each other.

As a result, for example, due to energy loss generated by collision between liquids L having the flows combined by the throttle part 32, viscous resistance of the liquid L, energy loss generated by variations in the flows of the liquid L, energy loss generated by friction between the liquid L and the throttle part 32, or the like, the pressure loss of the liquid L increases. Accordingly, vibrations are absorbed and dampened.

In addition, the liquid having the flows combined by the throttle part 32 passes through the second communication passage 42b and flows into the auxiliary liquid chamber 15.

In addition, if the liquid L inside the auxiliary liquid chamber 15 flows toward the main liquid chamber 14 side through the communication part 30, first, the liquid L flows from the second communication passage 42b into the communication part 30 to reach the intermediate chamber 43, and collide with the barrier rigid body 33. In this case, if a flow speed of the liquid L is high, the pressure loss of the liquid L increases and vibrations are absorbed and dampened due to energy loss generated by collision between the liquid L and the barrier rigid body 33, or the like.

In addition, after the liquid L collides with the barrier rigid body 33, the barrier rigid body 33 branches the flow of the liquid L, flowing into the communication part 30 toward the outer side in the flow passage radial direction. Thereafter, the flows of the liquid L branched by the barrier rigid body 33 are combined to each other by the first side throttle part 32. In this case, in a case where the flow speed of the liquid L, is a predetermined speed or more, the pressure loss of the liquid L increases, and it is possible to absorb and dampen vibrations.

As described above, here, if the pressure loss of the liquid L increases, the flow resistance of the liquid through the communication part 30 increases. As a result, the liquid L positively flows through the limit passage 41 between the main liquid chamber 14 and the auxiliary liquid chamber 15. In this case, since resonance is generated inside the limit passage 41, the input vibrations are further absorbed and dampened.

Meanwhile, for example, fine vibrations having higher frequencies and extremely smaller amplitudes than assumed those or the like may be unintentionally input to the vibration isolation device 10. When fine vibrations are input, since the flow speed of the liquid L flows into the communication parts 30 is low, even when the liquid L collides with the barrier rigid body 33 or the flows of the liquid L branched by the barrier rigid body 33 are combined by the throttle part 32, the pressure loss of the liquid L is suppressed. Accordingly, the liquid L passes through the communication parts 30 and smoothly flows between the main liquid chamber 14 and the auxiliary liquid chamber 15, and thus, an increase in a dynamic spring constant is suppressed.

As described above, according to the vibration isolation device 10 of the present embodiment, the pressure loss of the liquid L increases according to the flow speed of the liquid L flowing into the communication parts 30, and thus, it is possible to absorb and dampen vibrations. Accordingly, for example, when normal vibrations such as idle vibrations or shake vibrations are input, it is possible to dampen vibrations regardless of the frequencies of the vibrations. Accordingly, occurrence of noise is prevented while a plurality of kinds of vibrations having frequencies different from each other are absorbed and dampened, and thus, it is possible to improve simplification of structure and facilitation of manufacture.

In addition, for example, when normal vibrations are input, it is possible to absorb and dampen vibrations by not only the pressure loss of the liquid L but also the resonance in the limit passage 41. Accordingly, it is possible to effectively absorb and dampen the vibrations.

Moreover, in a state where a flow speed is low and the pressure loss of the liquid L is suppressed, the liquid L smoothly flows into the communication part 30, and an increase in the dynamic spring constant is suppressed. Accordingly, for example, when unintended vibrations such as fine vibrations having higher frequencies and extremely smaller amplitudes than normal vibrations are input, that is, when the flow speed of the liquid L is lower than the flow speed when the normal vibrations are input, it is possible to suppress an increase in the dynamic spring constant. As a result, it is possible to easily secure the product characteristics of the vibration isolation device 10.

In addition, since the barrier rigid body 33 is interposed between the first communication passage 42a and the second communication passage 42b inside the intermediate chamber 43, the liquid L which flows from any one of the main liquid chamber 14 and the auxiliary liquid chamber 15 into the intermediate chamber 43 can reliably collide with the barrier rigid body 33. Accordingly, it is possible to effectively absorb and dampen vibrations.

In addition, since the throttle parts 32 are provided, the liquids L branched by the barrier rigid body 33 collide with each other, many portions of the liquids L can contribute to energy loss, and it is possible to effectively increase the pressure loss of the liquid L.

Moreover, the throttle parts 32 change the flow of the liquid L which is branched by the barrier rigid body 33 and passes through the passing gaps 38 so as to be directed to the inner side in the flow passage radial direction. Accordingly, the liquid L which flows through the passing gaps 38 after being branched by the barrier rigid body 33 can reliably collide with the portion positioned on the inner side in the flow passage radial direction inside the communication part 30, and it is possible to more effectively increase the pressure loss of the liquid L.

In addition, since the barrier rigid body 33 is disposed on the flow passage axis M of the communication part 30, the liquid L which flows into the communication part 30 flows on the barrier rigid body 33. Accordingly, it is possible to branch the flow of the liquid L toward the outer side in the flow passage radial direction, and it is possible to reliably branch the flow of the liquid L.

In addition, since the plurality of communication parts 30 are provided on the partition member 16 in the circumferential direction and penetrate the partition member 16 in the direction of the axis O, it is possible to easily secure the flow passage areas of the communication parts 30. Accordingly, when vibrations are input to the vibration isolation device 10 and the flow speed of the liquid L in the communication parts 30 increases, a large amount of liquid L collides in the communication parts 30, it is possible to easily increase the pressure loss of the liquid L, and it is possible to effectively absorb and dampen vibrations.

Moreover, the plurality of communication parts 30 are provided. Accordingly, even when the communication parts 30 are reduced in a state where the shape of each communication part 30 is maintained compared to a case where only one communication part 30 is provided, it is possible to maintain the total of the cross-sectional areas of the plurality of communication parts 30 so as to be the same as the cross-sectional area of the communication part 30 in the case where only one communication part 30 is provided. As a result, it is possible to cause the total of the volumes of the plurality of communication parts 30 to be smaller than the volume of the communication part 30 in the case where only one communication part 30 is provided. Accordingly, compared to the case where only one communication part 30 is provided, it is possible to decrease the flow rate of the liquid L required for effectively generating the pressure loss of the liquid L. In addition, particularly, this effect is remarkably exhibited in a case where the number of the communication parts 30 is four or more.

Second Embodiment

Next, a vibration isolation device of a second embodiment of the present invention will be described with reference to FIGS. 4 and 5.

In addition, in the second embodiment, the same reference numerals are assigned to the same components as those of the first embodiment, descriptions thereof are omitted, and differences therebetween are mainly described.

Figure 4:
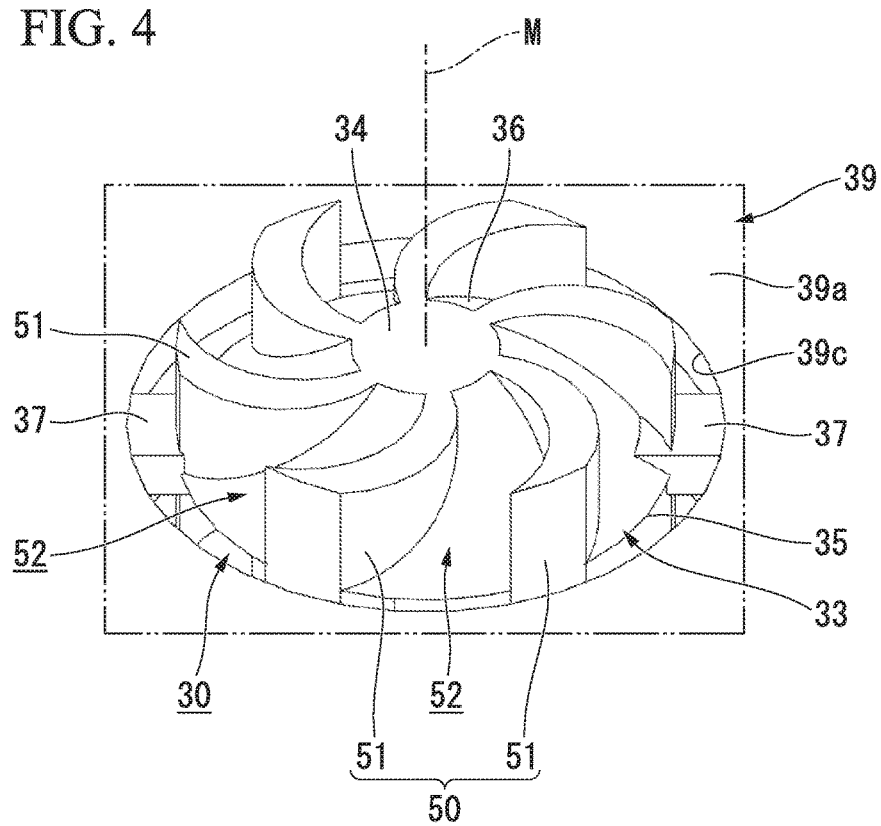
FIG. 4 is a perspective view of a barrier rigid body which configures a partition member included in a vibration isolation device according to a second embodiment of the present invention.
Figure 5:
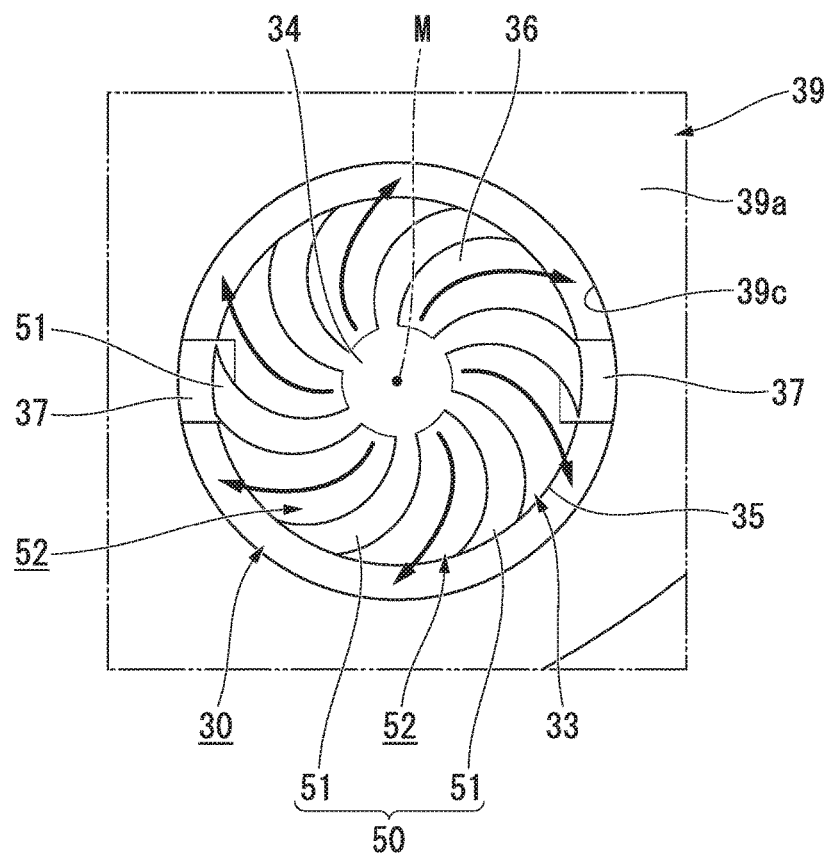
FIG. 5 is a plan view of the barrier rigid body shown in FIG. 4.

As shown in FIGS. 4 and 5, in the vibration isolation device of the present embodiment, a swirling part 50 is provided in the barrier rigid body 33. The swirling part 50 swirls the liquid L, which flows on the barrier rigid body 33, around the flow passage axis M while allowing the liquid L to flow toward the outer side in the flow passage radial direction. The swirling part 50 includes a plurality of protrusion parts 51 which are formed so as to have the same shape and the same size as each other.

Each of the protrusion part 51 extends from the end surface 34 of the barrier rigid body 33 toward the outer side in the flow passage radial direction. The protrusion part 51 is bent so as to extend to first side around the flow passage axis M toward the outer side in the flow passage radial direction. The protrusion part 51 protrudes toward the outer side around the flow passage axis M in a plan view when the barrier rigid body 33 is viewed in the direction of the axis O. The size of the protrusion part 51 around the flow passage axis M gradually increases from the inner side in the flow passage radial direction toward the outer side. The protruded end surface of the protrusion part 51 protruding toward the outer side in the flow passage radial direction is flush with the end edge of the acute-angle part 35 of the barrier rigid body 33. The top surface of the protrusion part 51 in the direction of the axis O is flush with the end surface 34 of the barrier rigid body 33.

The plurality of protrusion parts 51 are disposed around the flow passage axis M with the same intervals, and a swirling passage 52 which extends in the flow passage radial direction is provided between protrusion parts 51 adjacent to each other around the flow passage axis M. The swirling passage 52 extends from the end surface 34 of the barrier rigid body 33 toward the outer side in the flow passage radial direction, and reaches the acute-angle part 35 of the barrier rigid body 33. The swirling passage 52 is defined by both side surfaces which face each other around the flow passage axis M in the adjacent protrusion parts 51 around the flow passage axis M, and the portion of the tapered surface 36 which is positioned between the adjacent protrusion parts 51 around the flow passage axis M.

Vibrations in the direction of the axis O are input from the vibration generating part to the vibration isolation device, the liquid L reaches the intermediate chamber 43 and collides with the barrier rigid body 33, and thereafter, the liquid L flows on the tapered surfaces 36 of the barrier rigid body 33.

In this case, as shown in FIG. 5, the liquid L flows through the swirling passages 52, and thus, the liquid L is swirled around the flow passage axis M while being directed toward the outer side in the flow passage radial direction.

As described above, according to the vibration isolation device according to the present embodiment, the swirling part 50 is provided on the barrier rigid body 33. Accordingly, in a case where the flow speed of the liquid L flowing through the communication parts 30 increases, it is possible to increase the pressure loss of the liquid L by energy loss which is generated by changing the flow of the liquid L and forming a swirl flow, in addition to the energy loss which is generated by allowing the liquid L to collide with the barrier rigid body 33. Accordingly, it is possible to effectively absorb and dampen vibrations.

Third Embodiment

Next, a vibration isolation device according to a third embodiment of the present invention will be described with reference to FIGS. 6 and 7.

Moreover, in the third embodiment, the same reference numerals are assigned to the same components as those of the second embodiment, descriptions thereof are omitted, and differences therebetween are mainly described.

Figure 6:
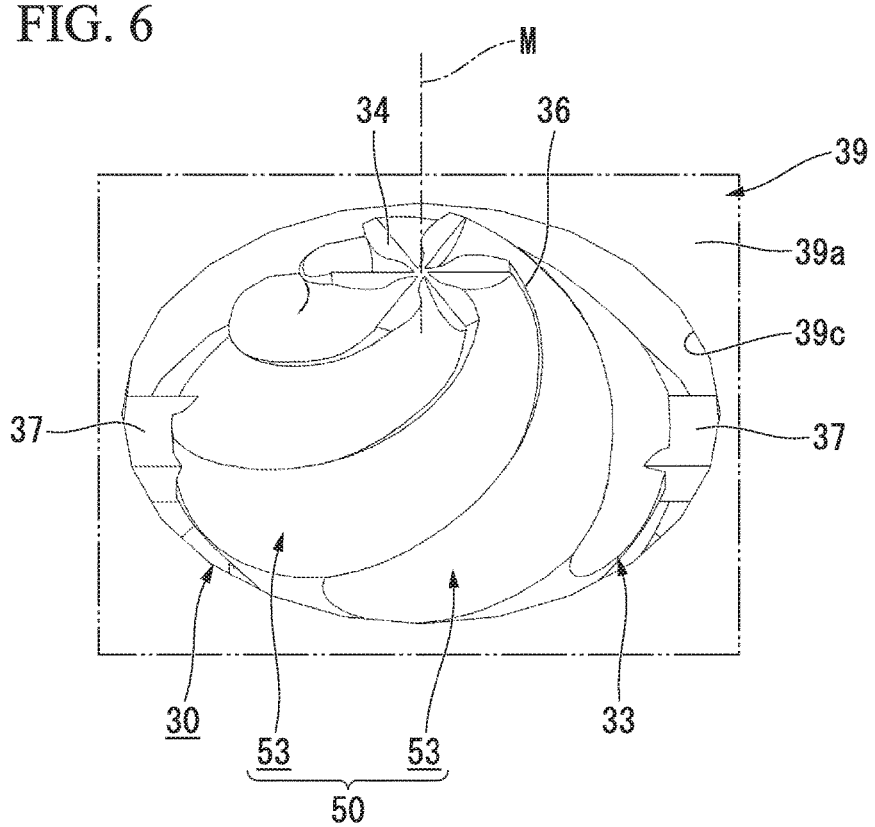
FIG. 6 is a perspective view of a barrier rigid body which configures a partition member included in a vibration isolation device according to a third embodiment of the present invention.
Figure 7:
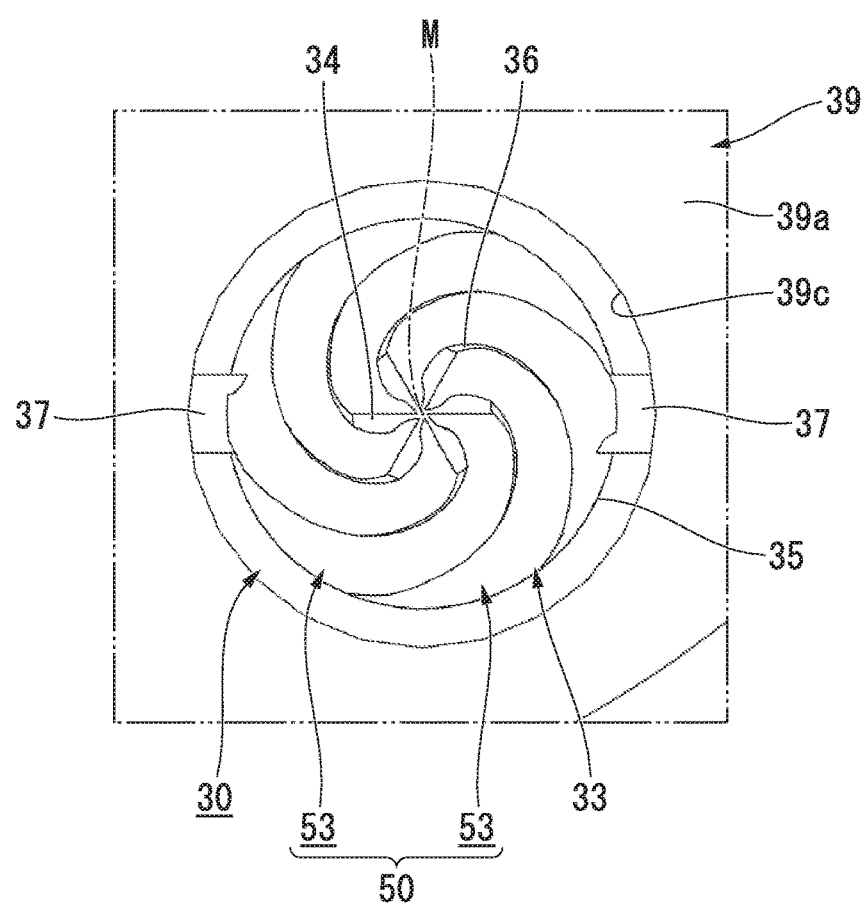
FIG. 7 is a plan view of the barrier rigid body shown in FIG. 6.

As shown in FIGS. 6 and 7, in the vibration isolation device of the present embodiment, the swirling part 50 includes a plurality of recessed parts 53 which are formed so as to have the same shape and the same size as each other. Each of the recessed parts 53 extends from the end surface 34 of the barrier rigid body 33 toward the outer side in the flow passage radial direction. The inner end of the recessed part 53 in the flow passage radial direction is open to the end surface 34 of the barrier rigid body 33. The recessed part 53 is bent so as to extend to first side around the flow passage axis M toward the outer side in the flow passage radial direction. The recessed part 53 protrudes toward the outer side around the flow passage axis M in a plan view. The plurality of recessed parts 53 are disposed so as to approach each other around the flow passage axis M, and the size around the flow passage axis M between the recessed parts 53 adjacent to each other around the flow passage axis M is smaller than the size of the recessed part 53 around the flow passage axis M.

When vibrations in the direction of the axis O are input from the vibration generating part to the vibration isolation device and the liquid L flows on the tapered surfaces 36 of the barrier rigid body 33, the liquid L flows through the recessed parts 53, and thus, the liquid L is swirled around the flow passage axis M while being directed to the outer side in the flow passage radial direction.

Fourth Embodiment

Next, a vibration isolation device 60 according to a fourth embodiment of the present invention will be described FIGS. 8 to 10.

In addition, in the fourth embodiment, the same reference numerals are assigned to the same components as those of the first embodiment, descriptions thereof are omitted, and differences therebetween are mainly described.

Figure 8:
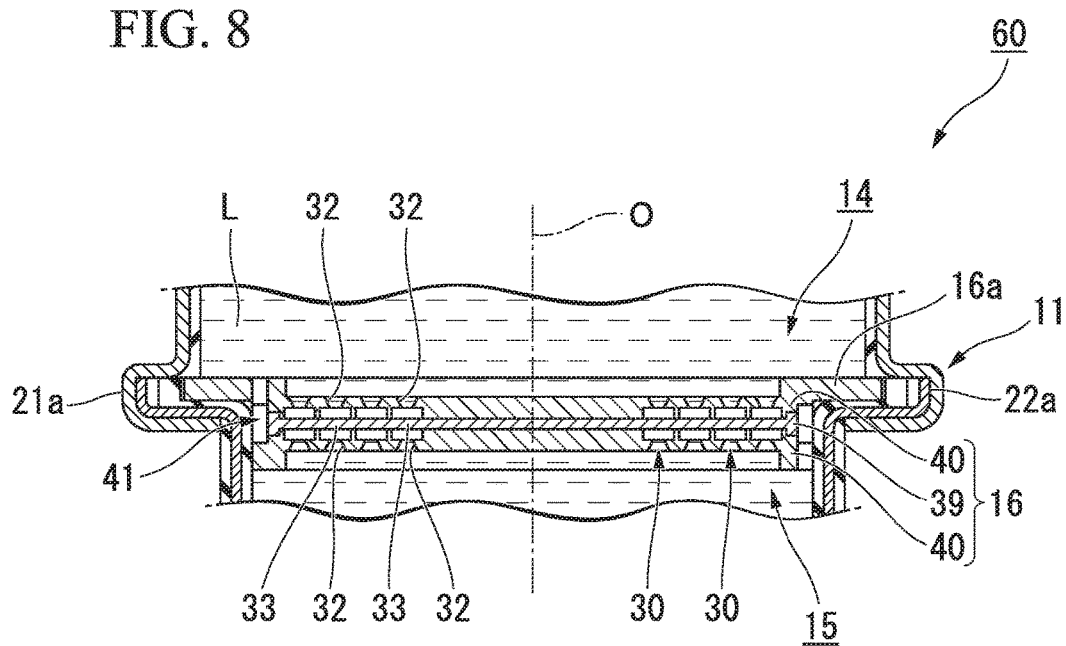
FIG. 8 is a longitudinal sectional view showing the vicinity of a partition member in a vibration isolation device according to a fourth embodiment of the present invention.
Figure 9:
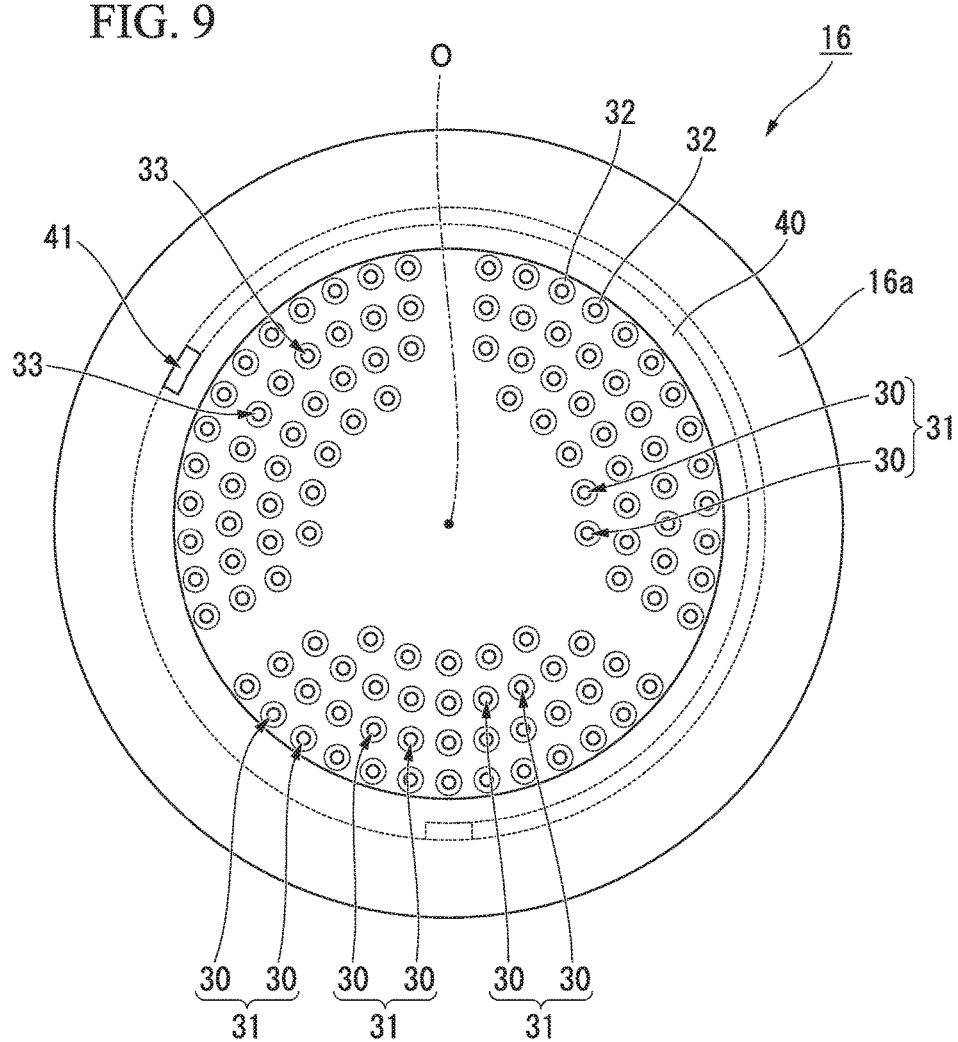
FIG. 9 is a plan view showing a partition member which configures the vibration isolation device shown in FIG. 8.

As shown in FIGS. 8 and 9, in the vibration isolation device 60 of the present embodiment, a plurality of passage rows 31 are provided on the partition member 16. The plurality of passage rows 31 have diameters different from each other, and multiple passage rows 31 are provided on the partition member 16.

Figure 10:
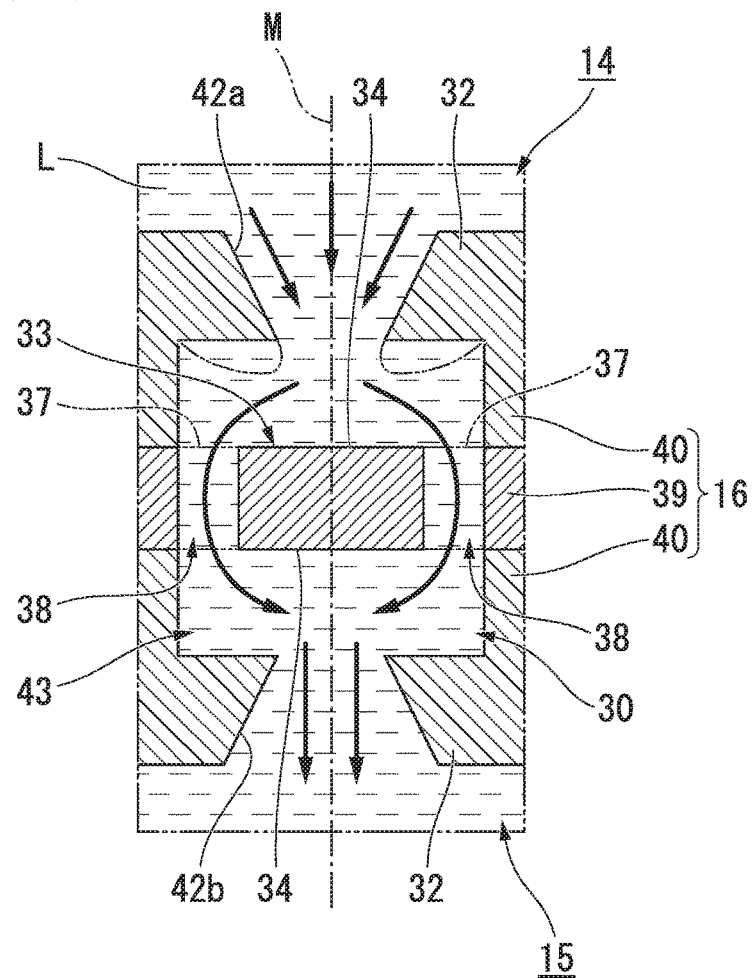
FIG. 10 is a longitudinal sectional view showing a main portion of the partition member shown in FIG. 9.

As shown in FIG. 10, in each communication part 30, the diameters of the inner peripheral surfaces of the throttle parts 32 gradually decrease from the outer side in the direction of the axis O toward the inner side. That is, the diameters of the first communication passage 42a and the second communication passage 42b gradually decrease from the outer side in the direction of the axis O toward the inner side. In addition, the outer diameter of the barrier rigid body 33 is larger than the inner diameter of the inner end of each throttle part 32 in the direction of the axis O and is the same over the entire length in the direction of the axis O, and the size of the barrier rigid body 33 in the direction of the axis O is the same as the size of the bridge part 37 in the direction of the axis O.

If vibrations in the direction of the axis O are input from the vibration generating part to the vibration isolation device 60 and the liquid L flows into the communication part 30 through the first communication passage 42a, the liquid L reaches the intermediate chamber 43 and collides with the barrier rigid body 33, and thereafter, the flow of the liquid flowing into the communication part 30 is branched toward the outer side in the flow passage radial direction. In this case, for example, the liquid L does not easily flows into a region of the communication part 30 between two-dotted chain lines shown in FIG. 10 and the inner peripheral surface of the communication part 30 and flow separation occurs, an effective cross-section in the communication part 30 decreases, and the pressure loss of the liquid L increases. Thereafter, the flows of the liquid L branched by the barrier rigid body 33 are combined by the throttle part 32 so as to face each other, and thus, the liquids L collide with each other, and the pressure loss of the liquid L further increases.

Fifth Embodiment

Next, a vibration isolation device according to a fifth embodiment of the present invention will be described with reference to FIG. 11.

In addition, in the fifth embodiment, the same reference numerals are assigned to the same components as those of the fourth embodiment, descriptions thereof are omitted, and differences therebetween are mainly described.

Figure 11:
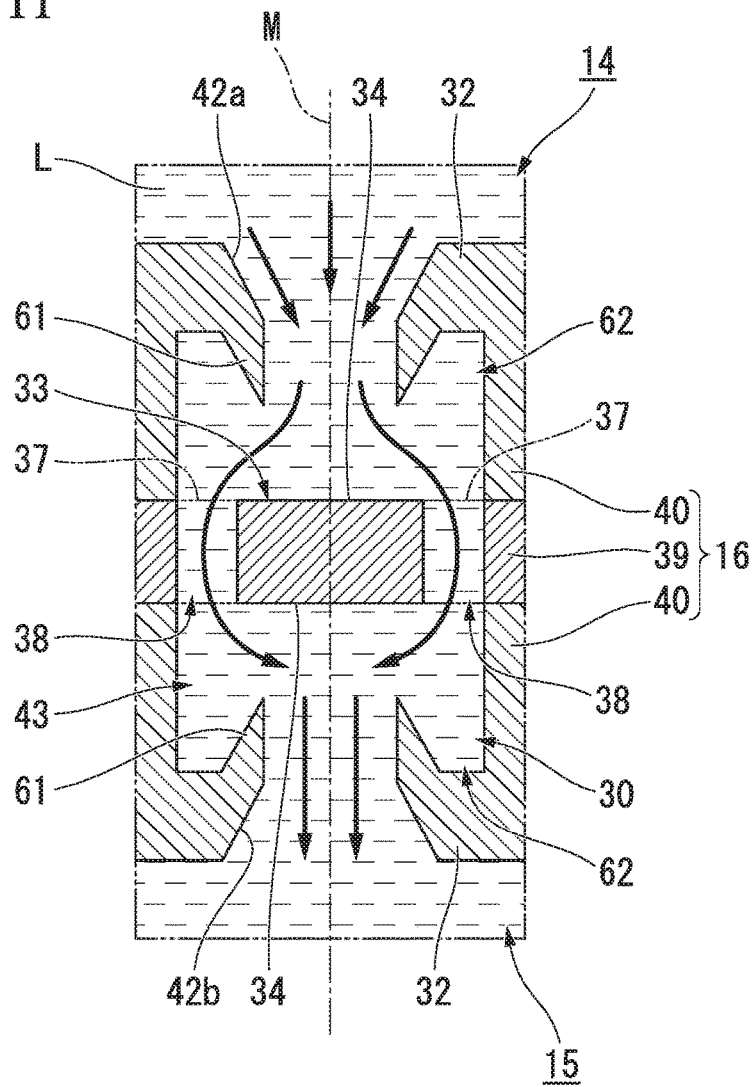
FIG. 11 is a longitudinal sectional view showing a main portion of a partition member included in a vibration isolation device according to a fifth embodiment of the present invention.

As shown in FIG. 11, in the vibration isolation device of the present embodiment, protrusion tubes 61 which protrude toward the inner side in the direction of the axis O are provided on the throttle parts 32. The protrusion tube 61 is provided on each of the pair of throttle parts 32, and is disposed coaxially with the axis O. The inner diameters of the protrusion tubes 61 are the same as each other over the entire length in the direction of the axis O, and the outer diameter of each of the protrusion tubes 61 gradually decreases from the outer side in the direction of the axis O toward the inner side.

In the protrusion tube 61, an annular space part 62 which is open toward the inner side in the direction of the axis O is provided between the outer peripheral surface of the protrusion tube 61 provided on the inner peripheral edge part of the throttle part 32 and the inner peripheral surface of the intermediate part of the communication part 30 in the direction of the axis O. The inner diameter of the space part 62 decreases from the outer side in the direction of the axis O toward the inner side.

Moreover, in the present embodiment, the first communication passage 42a is configured of the inside of the throttle part 32 which is the first side of two throttle parts 32, and the inside of the protrusion tube 61 provided in the throttle part 32. In addition, the second communication passage 42h is configured of the inside of the throttle part 32 which is the second side of two throttle parts 32, and the inside of the protrusion tube 61 provided in the throttle part 32.

Six Embodiment

Next, a vibration isolation device according to a sixth embodiment of the present invention will be described with reference to FIGS. 12 to 14.

In addition, in the sixth embodiment, the same reference numerals are assigned to the same components as those of the first embodiment, descriptions thereof are omitted, and differences therebetween are mainly described.

Figure 12:
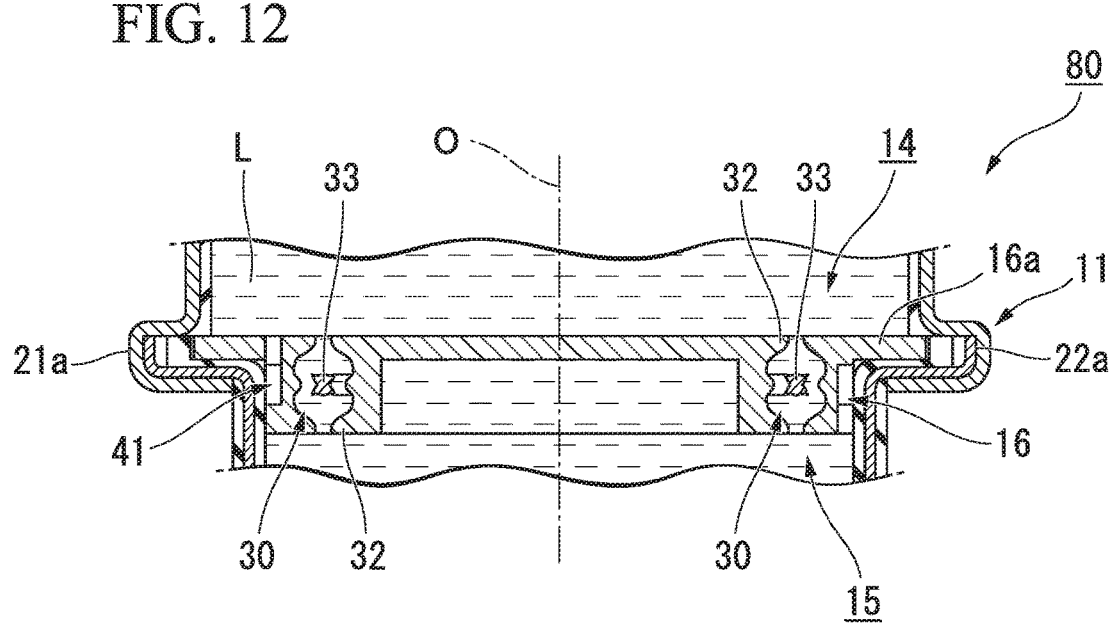
FIG. 12 is a longitudinal sectional view showing the vicinity of a partition member in a vibration isolation device according to a sixth embodiment of the present invention.
Figure 13:
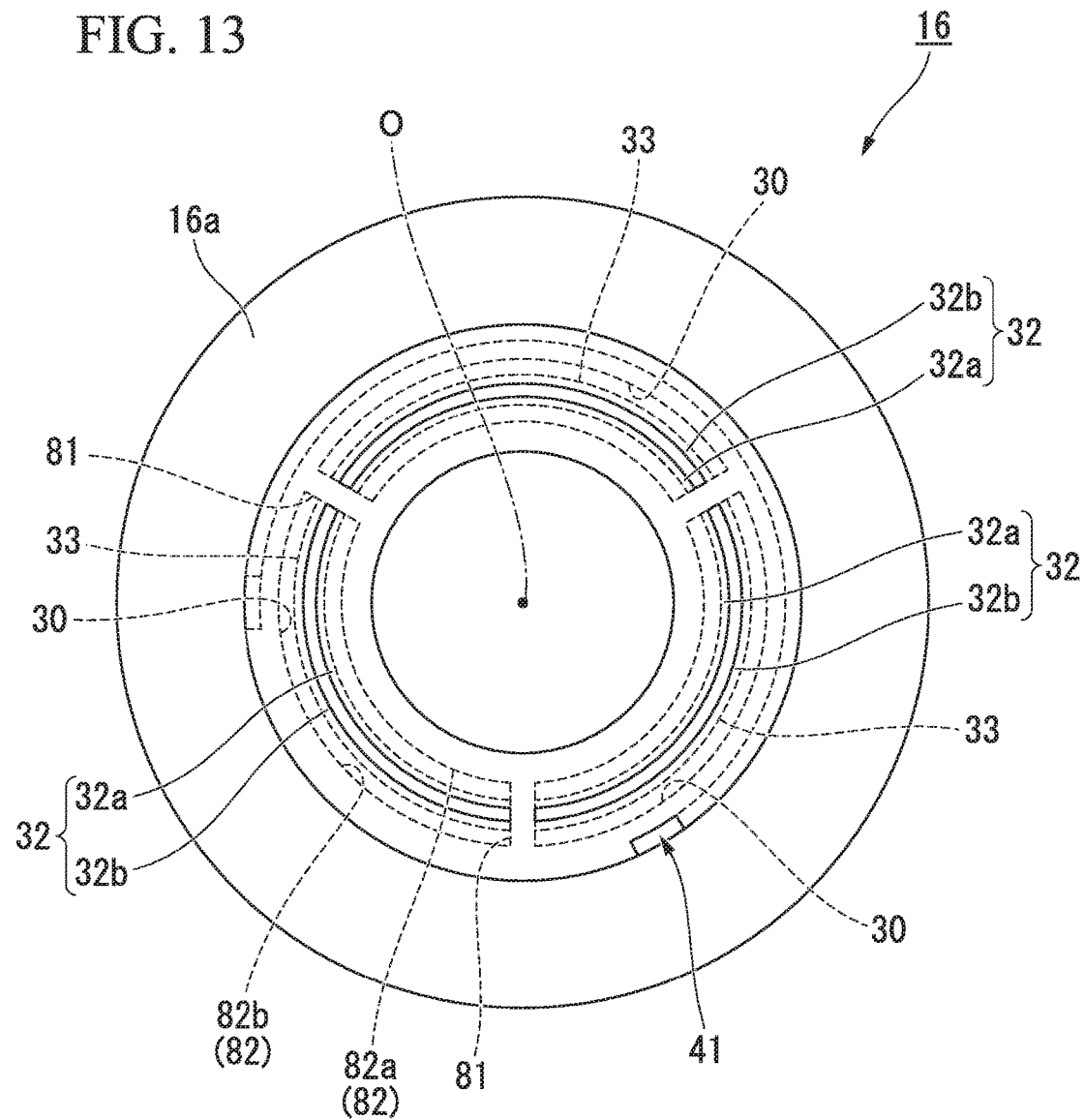
FIG. 13 is a bottom view showing the partition member which configures the vibration isolation device shown in FIG. 12.

As shown in FIGS. 12 and 13, in the vibration isolation device 80 of the present embodiment, the communication part 30 is formed in a rectangular shape extending in the circumferential direction instead of being formed in a circular shape in a plan view in which the partition member 16 is viewed in the direction of the axis O. In a plan view, the communication part 30 is bent in the radial direction (insertion direction) while extending in the circumferential direction and protrudes toward the radial outer side.

The inner peripheral surface of the communication part 30 is configured of a pair of small wall surfaces 81 in the circumferential direction and a pair of large wall surfaces 82 in the radial direction. The large wall surfaces 82 faces each other in the radial direction, and the large wall surfaces 82 include an inner large wall surface 82a which is positioned on the radial inner side, and an outer large wall surface 82b which is positioned on the radial outer side.

Here, in the present embodiment, instead of the throttle part 32 annularly protruding from the inner peripheral surface of the communication part 30, the throttle part 32 protrudes in the radial direction from each of the pair of large wall surfaces 82. The throttle part 32 is provided over the entire length of the large wall surface 82 in the circumferential direction, and thus, both ends of the throttle part 32 in the circumferential direction are coupled to the small wall surfaces 81.

The throttle part 32 includes an inner throttle part 32a which protrudes from the inner large wall surface 82a toward the radial outer side, and an outer throttle part 32b which protrudes from the outer large wall surface 82b toward the radial inner side. As shown in FIG. 14, the inner throttle part 32a gradually extends toward the inner side in the direction of the axis O from the radial outer side toward the radial inner side, and the outer throttle part 32b gradually extends toward the inner side in the direction of the axis O from the radial inner side toward the radial outer side. A surface of the throttle part 32 which faces the inner side in the direction of the axis O is inclined to the flow passage axis M in a longitudinal cross-sectional view of the communication part 30 in both directions of the direction of the axis O and the radial direction.

Here, in the present embodiment, the first communication passage 42a is configured of a space between the inner throttle part 32a and the outer throttle part 32b which are positioned on the first side. In addition, the second communication passage 42b is configured of a space between the inner throttle part 32a and the outer throttle part 32b which are positioned on the second side. The widths of the first communication passage 42a and the second communication passage 42b gradually increase in the radial direction from the outer side in the direction of the axis O toward the inner side.

A protrusion part 83 which protrudes in the radial direction is provided on the center part in the direction of the axis O on the inner peripheral surface of the communication part 30. The protrusion part 83 is provided on the center part in the direction of the axis O on each large wall surface 82, and is accommodated in the intermediate chamber 43. The protrusion part 83 is formed in a protrusion shape which extends in the circumferential direction, and both ends of the protrusion part 83 in the circumferential direction are coupled to the small wall surfaces 81. In a longitudinal cross-sectional view, the protrusion part 83 is formed in a convex-curved surface shape which protrudes in the radial direction.

As shown in FIG. 13, the barrier rigid body 33 is formed in a rod shape which extends in the circumferential direction. In a plan view, the barrier rigid body 33 is bent in the radial direction while extending in the circumferential direction, and protrudes toward the radial outer side. Both ends of the barrier rigid body 33 in the circumferential direction are coupled to the pair of small wall surfaces 81.

Figure 14:
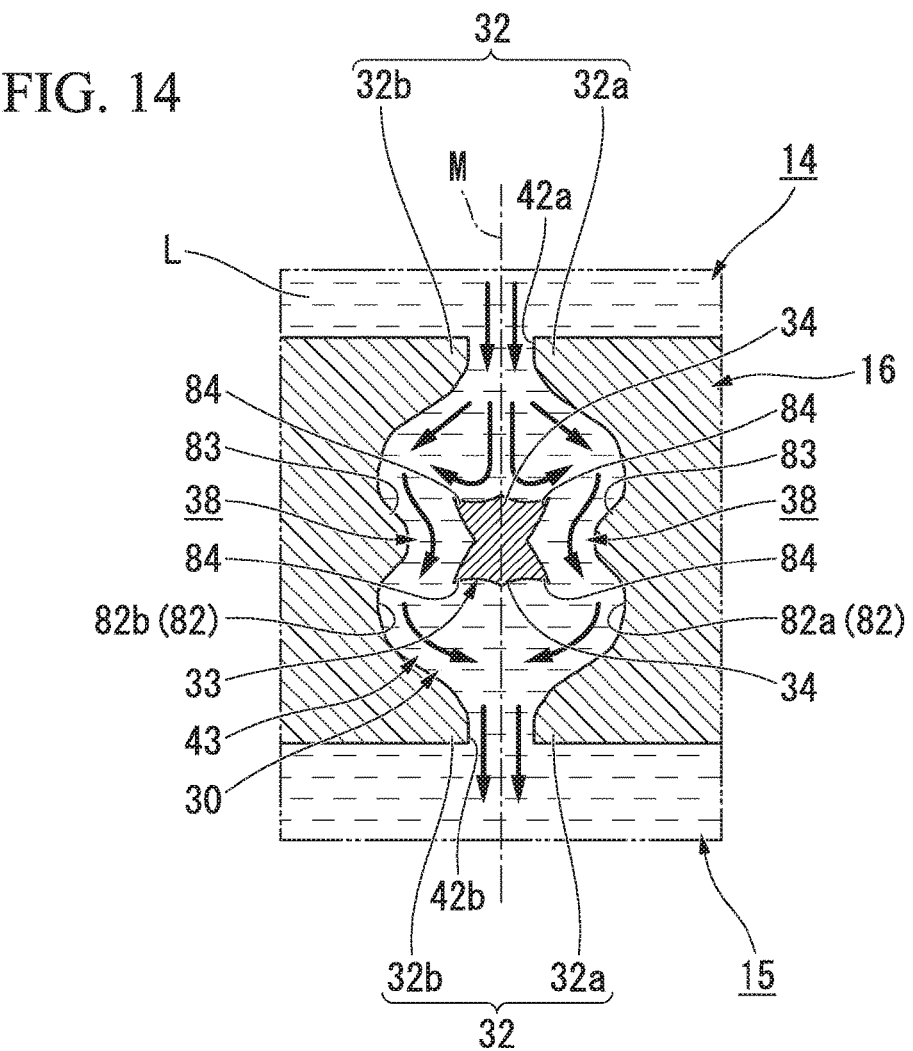
FIG. 14 is a longitudinal sectional view showing a main portion of the partition member shown in FIG. 13.

As shown in FIG. 14, the end surface 34 of the barrier rigid body 33 in the direction of the axis O gradually extends toward the inner side in the direction of the axis O from the center in the radial direction toward both sides in the radial direction. The size of the barrier rigid body 33 in the radial direction decreases from both sides in the radial direction from the outer side in the direction of the axis O toward the inner side in the direction of the axis O.

The passing gaps 38 through which the liquid L passes in the direction of the axis O are formed between the inner peripheral surface of the communication part 30 and the outer peripheral surface of the barrier rigid body 33 in a state where the barrier rigid body 33 is interposed therebetween. The pair of passing gaps 38 is provided in a state where the barrier rigid body 33 is interposed therebetween in the radial direction. The size of each of the passing gaps 38 in the radial direction is the same over the entire length in the direction of the axis O, and similarly, the flow passage cross-sectional areas of the passing gaps 38 is the same over the entire length in the direction of the axis O.

Here, a return part (second confluent part) 84 is provided on the barrier rigid body 33. The return part 84 inverts the direction of the flow of the liquid L branched by the barrier rigid body 33 to the direction of the axis O, and combines the flow of the liquid L with the flows of other liquids L. The return part 84 is provided on each of both ends of the barrier rigid body 33 in the radial direction, and combines the flow of the liquid L flowing on the barrier rigid body 33 with the flow of the liquid flowing toward the passing gaps 38 along the inner peripheral surface of the communication part 30 of the liquids L flowing through the communication part 30.

In the return part 84, both ends on the end surface 34 of the barrier rigid body 33 in the radial direction extend toward the outer side in the direction of the axis O, and in a longitudinal cross-sectional view, is formed in a concave-curved surface shape which is recessed toward the inner side in the direction of the axis O. The return parts 84 are provided on both ends of the end surface 34 of the barrier rigid body 33 in the radial direction over the entire length in the circumferential direction.

If vibrations in the direction of the axis O are input to the vibration isolation device 80 from the vibration generating part, for example, the liquid L inside the main liquid chamber 14 flows toward the auxiliary liquid chamber 15 side through the communication part 30, first, as shown in FIG. 14, the liquid L flows into the communication part 30 from the inside of the first communication passage 42a. Thereafter, a portion of the liquid L spreads toward both sides inside the communication part 30 in the radial direction, and flows toward the passing gaps 38 along the large wall surfaces 82 of the inner peripheral surface of the communication part 30.

In addition, the flow of the liquid L which flows toward the barrier rigid body 33 in the direction of the axis O of the liquid L flowing into the communication part 30 collides with the barrier rigid body 33, and thereafter, is branched toward both sides in the radial direction by the barrier rigid body 33. In this case, the liquid L flows on the end surface 34 of the barrier rigid body 33, the return part 84 inverts the direction of the flow of the liquid L to the direction of the axis O, and the flow of the liquid L is combined with the above-described liquid L flowing toward the passing gaps 38.

Accordingly, when normal vibrations such as idle vibrations or shake vibrations are input to the vibration isolation device 80 and the flow speed of the liquid L flowing through the communication part 30 increases, for example, due to energy loss generated by collision between the liquid L and the barrier rigid body 33, energy loss generated by collision between the liquids L having the flow combined by the return part 84, or the like, the pressure loss of the liquid L increases.

In addition, the technical scope of the present invention is not limited to the above-described embodiments, and various modifications may be applied within a scope which does not depart from the aim of the present invention.

In the present embodiment, the plurality of communication parts 30 may not be provided, and one communication part 30 may be provided.

In addition, in the above-described embodiments, the main liquid chamber 14 and the auxiliary liquid chamber 15 communicate with each other via the limit passage 41 different from the communication part 30 in addition to the communication part 30. However, the present invention is not limited to this. For example, the limit passage may not be provided, and the main liquid chamber and the auxiliary liquid chamber may communicate with each other via only the communication part.

Moreover, in the above-described embodiments, for example, the inside of the limit passage 41, the inside of the first communication passage 42a, or the inside of the second communication passage 42b may be closed by a membrane which is elastically deformed by the liquid pressure of the liquid L such as an elastic thin film. In this case, since the liquid pressures of the liquids L which are positioned on both sides in a state where the membrane is interposed therebetween are transmitted via the membrane, the liquid L flows to the inside of the limit passage 41, the inside of the first communication passage 42a and the inside of the second communication passage 42b.

In addition, in the above-described embodiments, the partition member 16 partitions the liquid chamber inside the first attachment member 11 into the main liquid chamber 14 which has the elastic body 13 as a portion of the wall surface thereof, and the auxiliary liquid chamber 15. However, the present invention is not limited to this. For example, instead of providing the diaphragm, a pair of elastic bodies may be provided in the axial direction O, and instead of providing the auxiliary liquid chamber 15, a pressure-receiving liquid chamber which has the elastic body as a portion of the wall surface thereof may be provided. That is, the partition member partitions the liquid chamber inside the first attachment member having the liquid enclosed therein into the first liquid chamber and the second liquid chamber, and at least one of both the liquid chambers such as the first liquid chamber and the second liquid chamber may be appropriately changed to another configuration which has the elastic body as a portion of the wall surface thereof.

In addition, in the above-described embodiment, the case is described in which an engine is connected to the second attachment member 12 and the first attachment member 11 is connected to the vehicle body. However, inversely, an engine may be connected to the first attachment member 11 and the second attachment member 12 may be connected to the vehicle body.

In addition, the vibration isolation device 10 according to the present invention is not limited to an engine mount of a vehicle, and may be applied to a mount different from the engine mount. For example, the present invention may be applied to a mount of a generator which is mounted on a construction machine, or may be applied to a mount of a machine which is installed on factory or the like.

In addition, the constituent elements in the embodiment can be appropriately substituted with well-known constituent elements within the scope which does not depart from the scope of the invention. Additionally, the above-described modifications may be appropriately combined.

INDUSTRIAL APPLICABILITY

According to the vibration isolation device of the present invention, it is possible to improve simplification of structure and facilitation of manufacture while securing product characteristics.

REFERENCE SIGNS LIST 10, 60, 80: vibration isolation device
11: first attachment member
12: second attachment member
13: elastic body
14: main liquid chamber (first liquid chamber)
15: auxiliary liquid chamber (second liquid chamber)
16: partition member
33: barrier rigid body
41: limit passage
42a: first communication passage
42b: second communication passage
43: intermediate chamber
L: liquid

The invention claimed is:

1. A vibration isolation device, comprising:
a tubular first attachment member coupled to one of a vibration generating part and a vibration receiving part, and a second attachment member coupled to the other thereof;
an elastic body which couples both the attachment members together; and
a partition member which partitions a liquid chamber within the first attachment member having a liquid enclosed therein into a first liquid chamber and a second liquid chamber,
wherein at least one of the first liquid chamber and the second liquid chamber has the elastic body as a portion of a wall surface thereof,
wherein the partition member includes an intermediate chamber which is disposed inside the partition member, a first communication passage which communicates with the intermediate chamber and the first liquid chamber, and a second communication passage which communicates with the intermediate chamber and the second liquid chamber,
wherein a barrier rigid body which faces at least one of the first communication passage and the second communication passage is disposed inside the intermediate chamber,
wherein the barrier rigid body has rigidity such that the barrier rigid body is not deformed when being subjected to the flow of the liquid, and
wherein the first communication passage, the second communication passage, and the barrier rigid body are coaxially aligned with a flow passage axis, the flow passage axis extending in parallel with an axis of the first attachment member.

2. The vibration isolation device according to claim 1,
wherein the first communication passage and the second communication passage face each other in a state where the intermediate chamber is interposed therebetween, and
wherein the barrier rigid body is interposed between the first communication passage and the second communication passage inside the intermediate chamber.

3. The vibration isolation device according to claim 2,
wherein the partition member includes a limit passage which is provided independently from the intermediate chamber, the first communication passage, and the second communication passage, and communicates with the first liquid chamber and the second liquid chamber.

4. The vibration isolation device according to claim 1,
wherein the partition member includes a limit passage which is provided independently from the intermediate chamber, the first communication passage, and the second communication passage, and communicates with the first liquid chamber and the second liquid chamber.

5. The vibration isolation device according to claim 1,
wherein, at the first communication passage, a path of the flow of the liquid is a single path,
wherein, at the intermediate chamber, a path of the flow of the liquid is divided into a plurality of paths by the barrier rigid body, and
wherein, at the second communication passage, a path of the flow of the liquid is a single path.

6. The vibration isolation device according to claim 1,
wherein the partition member includes a plurality of sets of the intermediate chamber in a circular manner around an axis of the first attachment member.

7. The vibration isolation device according to claim 1,
wherein, at a first outer peripheral surface of the barrier rigid body in a direction perpendicular to an axis of the first attachment member, the barrier rigid body is partly connected with the partition member with a bridge part,
wherein, at a second outer peripheral surface of the barrier rigid body in the direction perpendicular to the axis of the first attachment member, a gap between the barrier rigid body and the partition member is provided to allow the liquid to flow between the first communication passage and the second communication passage.

8. The vibration isolation device according to claim 1,
wherein a flow passage axis is a common axis of the first communication passage, the second communication passage, and the intermediate chamber, and
wherein the barrier rigid body is disposed on the flow passage axis and between the first communication passage and the second communication passage.

9. A vibration isolation device, comprising:
a tubular first attachment member coupled to one of a vibration generating part and a vibration receiving part, and a second attachment member coupled to the other thereof;
an elastic body which couples both the attachment members together; and
a partition member which partitions a liquid chamber within the first attachment member having a liquid enclosed therein into a first liquid chamber and a second liquid chamber,
wherein at least one of the first liquid chamber and the second liquid chamber has the elastic body as a portion of a wall surface thereof,
wherein the partition member includes an intermediate chamber which is disposed inside the partition member, a first communication passage which communicates with the intermediate chamber and the first liquid chamber, and a second communication passage which communicates with the intermediate chamber and the second liquid chamber, and
wherein a barrier rigid body which faces at least one of the first communication passage and the second communication passage is disposed inside the intermediate chamber,
wherein the barrier rigid body has rigidity such that the barrier rigid body is not deformed when being subjected to the flow of the liquid,
wherein, at the first communication passage, a path of the liquid is a single path,
wherein, at the intermediate chamber, a path of the liquid is divided into a plurality of sub-paths by the barrier rigid body, and
wherein, at the second communication passage, a path of the liquid is a single path.

10. The vibration isolation device according to claim 9,
wherein the first communication passage and the second communication passage face each other in a state where the intermediate chamber is interposed therebetween, and
wherein the barrier rigid body is interposed between the first communication passage and the second communication passage inside the intermediate chamber.

11. The vibration isolation device according to claim 9,
wherein the partition member includes a limit passage which is provided independently from the intermediate chamber, the first communication passage, and the second communication passage, and communicates with the first liquid chamber and the second liquid chamber.

12. The vibration isolation device according to claim 9, wherein the partition member includes a plurality of sets of the intermediate chamber in a circular manner around an axis of the first attachment member.

13. The vibration isolation device according to claim 9, wherein, at a first outer peripheral surface of the barrier rigid body in a direction perpendicular to an axis of the first attachment member, the barrier rigid body is partly connected with the partition member with a bridge part, wherein, at a second outer peripheral surface of the barrier rigid body in the direction perpendicular to the axis of the first attachment member, a gap between the barrier rigid body and the partition member is partly provided to allow the liquid to flow between the first communication passage and the second communication passage.

14. The vibration isolation device according to claim 9, wherein a flow passage axis is a common axis of the first communication passage, the second communication passage, and the intermediate chamber, and wherein the barrier rigid body is disposed on the flow passage axis and between the first communication passage and the second communication passage.

15. A vibration isolation device, comprising:
a tubular first attachment member coupled to one of a vibration generating part and a vibration receiving part, and a second attachment member coupled to the other thereof;
an elastic body which couples both the attachment members together; and
a partition member which partitions a liquid chamber within the first attachment member having a liquid enclosed therein into a first liquid chamber and a second liquid chamber,
wherein at least one of the first liquid chamber and the second liquid chamber has the elastic body as a portion of a wall surface thereof,
wherein the partition member includes an intermediate chamber which is disposed inside the partition member, a first communication passage which communicates with the intermediate chamber and the first liquid chamber, and a second communication passage which communicates with the intermediate chamber and the second liquid chamber,
wherein a barrier rigid body which faces at least one of the first communication passage and the second communication passage is disposed inside the intermediate chamber,
wherein the barrier rigid body has rigidity such that the barrier rigid body is not deformed when being subjected to the flow of the liquid,
wherein, at a first outer peripheral portion of the barrier rigid body in a direction perpendicular to an axis of the first attachment member, the barrier rigid body is connected with the partition member via a bridge part, and
wherein, at a second outer peripheral portion of the barrier rigid body in a direction perpendicular to an axis of the first attachment member, a gap between the barrier rigid body and the partition member is partly provided to allow the liquid to flow between the first communication passage and the second communication passage.

16. The vibration isolation device according to claim 15, wherein the first communication passage and the second communication passage face each other in a state where the intermediate chamber is interposed therebetween, and
wherein the barrier rigid body is interposed between the first communication passage and the second communication passage inside the intermediate chamber.

17. The vibration isolation device according to claim 15, wherein the partition member includes a limit passage which is provided independently from the intermediate chamber, the first communication passage, and the second communication passage, and communicates with the first liquid chamber and the second liquid chamber.

18. The vibration isolation device according to claim 15, wherein the partition member includes a plurality of sets of the intermediate chamber in a circular manner around an axis of the first attachment member.

19. The vibration isolation device according to claim 15, wherein a flow passage axis is a common axis of the first communication passage, the second communication passage, and the intermediate chamber, and
wherein the barrier rigid body is disposed on the flow passage axis and between the first communication passage and the second communication passage.

* * * * *